(12) United States Patent
Fujimoto

(10) Patent No.: US 8,632,245 B2
(45) Date of Patent: Jan. 21, 2014

(54) TEMPERATURE SENSOR

(75) Inventor: Seizo Fujimoto, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 13/243,197

(22) Filed: Sep. 23, 2011

(65) Prior Publication Data
US 2012/0294330 A1 Nov. 22, 2012

(30) Foreign Application Priority Data

May 19, 2011 (JP) .................................. 2011-112266

(51) Int. Cl.
G01K 7/00 (2006.01)
G01K 5/00 (2006.01)
G01K 9/00 (2006.01)
H01C 3/04 (2006.01)
H01C 7/02 (2006.01)

(52) U.S. Cl.
USPC .............. 374/143; 374/163; 374/193; 338/25

(58) Field of Classification Search
USPC .................................................. 374/143, 148
See application file for complete search history.

(56) References Cited

U.S. PATENT DOCUMENTS 7,410,294 B2 * 8/2008 Shiraki et al. ................. 374/208

FOREIGN PATENT DOCUMENTS

JP 58095228 A 6/1983
JP 2002-267546 A 9/2002

OTHER PUBLICATIONS

Japanese Office Action dated Apr. 16, 2013 issued in corresponding Japanese Patent Application No. 2011-112266.

* cited by examiner

*Primary Examiner* — Lisa Caputo
*Assistant Examiner* — Brandi N Hopkins
(74) *Attorney, Agent, or Firm* — Sughrue Mion, PLLC

(57) ABSTRACT

A temperature sensor is provided that can easily make possible stuffing with the filler or burying of the temperature detector element so that faster temperature response can be achieved. A temperature sensor has a closed-bottom tubular shaped case, a temperature detector element inserted and accommodated in the case, and a filler filled in the case and sealing the temperature detector element. The temperature sensor is provided with a filler flowing portion formed in a relative gap between the case and the temperature detector element along an insertion direction of the temperature detector element and having a gap relative to the temperature detector element larger than that relative to the remainder portion of the gap.

8 Claims, 8 Drawing Sheets

TEMPERATURE SENSOR

BACKGROUND OF THE INVENTION

1. Field of the Invention

The present invention relates to a temperature sensor for measuring temperature using a temperature detector element.

2. Description of Related Art

When it is necessary to measure the temperature of an object in various electronic devices, it has been common to use a known method of disposing a temperature detector element at a location at which the temperature needs to be measured.

When this temperature detector element is used for measuring the temperature of liquid or when exposed under a polluted environment, the use of the temperature detector element is made possible by disposing and protecting the temperature detector element in a resin case or a metal case so as to be isolated from the polluted environment. In addition, it is considered desirable that the temperature response in temperature measurement should be fast so as to immediately follow the temperature change of the substance to be measured.

The relationship between the case and the temperature detector element is as disclosed in Patent Document 1 (hereinafter referred to as "the conventional example").

A temperature detector element is disposed in a case, and the gap between the case and the temperature detector element is filled with a filler (referred to as a "resin part" in the conventional example). The smaller the gap is, the faster the temperature response. However, it is also disclosed in the conventional example that, when the gap becomes small, the filler cannot enter the gap, and consequently, the temperature response becomes rather slow.

The conventional example has found such a gap that the temperature response becomes less than 4 seconds even when the filler cannot enter the gap. However, the temperature response is, naturally, slower than the case in which this gap is filled with the filler.

In addition, as a matter of course, increasing the heat conductivity of the case and the filler to make the temperature response faster also yields a desirable effect in addition to narrowing the gap.

REFERENCES

Patent Documents

Patent Document 1: JP-A-2002-267546

As described in the conventional example, it is necessary to ensure that the gap between the case and the temperature detector element has a certain size. If the gap is made small in the case of supplying the filler after putting the temperature detector element into the case, the gap cannot be filled with the filler and the gap will be left as a space, so the temperature response will become poorer than the case where the filler exists therein. If the gap is small in the case of putting the temperature detector element into the case after supplying the filler, the temperature detector element cannot sink into the filler and the assembling will become impossible.

SUMMARY OF THE INVENTION

In view of such circumstances as described above, it is an object of the invention to provide a temperature sensor that easily makes possible stuffing with the filler or burying of the temperature detector element even in a gap between the case and the temperature detector element such that the gap cannot be filled with a filler and is left as a space with the conventional example or that the temperature detector element cannot sink into the filler with the conventional example, and that has a faster temperature response.

The invention provides a temperature sensor including: a closed-bottom tubular shaped case; a temperature detector element inserted and accommodated in the case; and a filler filled in the case and sealing the temperature detector element. The temperature sensor has a filler flowing portion formed in a relative gap between the case and the temperature detector element along an insertion direction of the temperature detector element and having a larger gap relative to the temperature detector element than that relative to the remainder of the gap.

The temperature sensor according to the invention makes possible stuffing with the filler or burying of the temperature detector element even in a gap between the case and the temperature detector element such that the gap cannot be filled with a filler and is left as a space with the conventional example or that the temperature detector element cannot sink into the filler with the conventional example. As a result, the temperature sensor according to the invention can achieve faster temperature response.

The foregoing and other object, features, aspects, and advantages of the present invention will become more apparent from the following detailed description of the present invention when taken in conjunction with the accompanying drawings.

DETAILED DESCRIPTION OF THE INVENTION

First Embodiment

Figure 1:
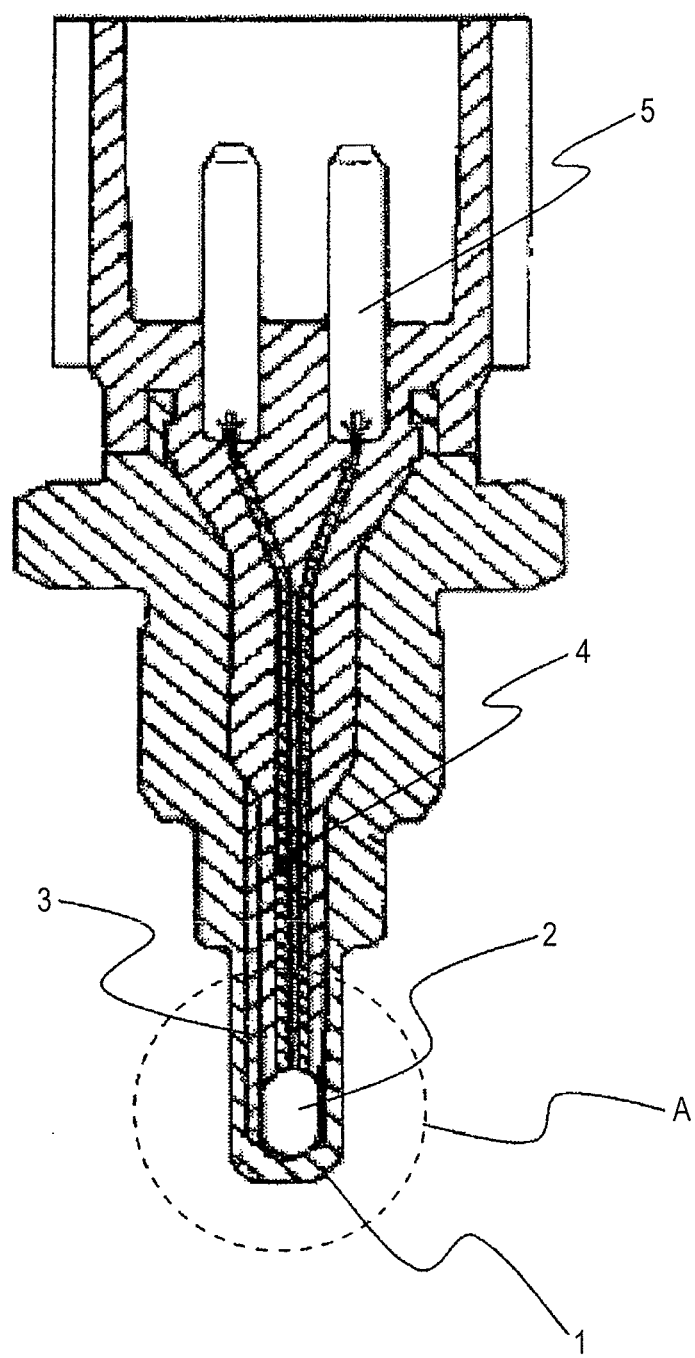
FIG. 1 is a cross-sectional view showing a temperature sensor according to a first embodiment of the invention.
Figure 2:
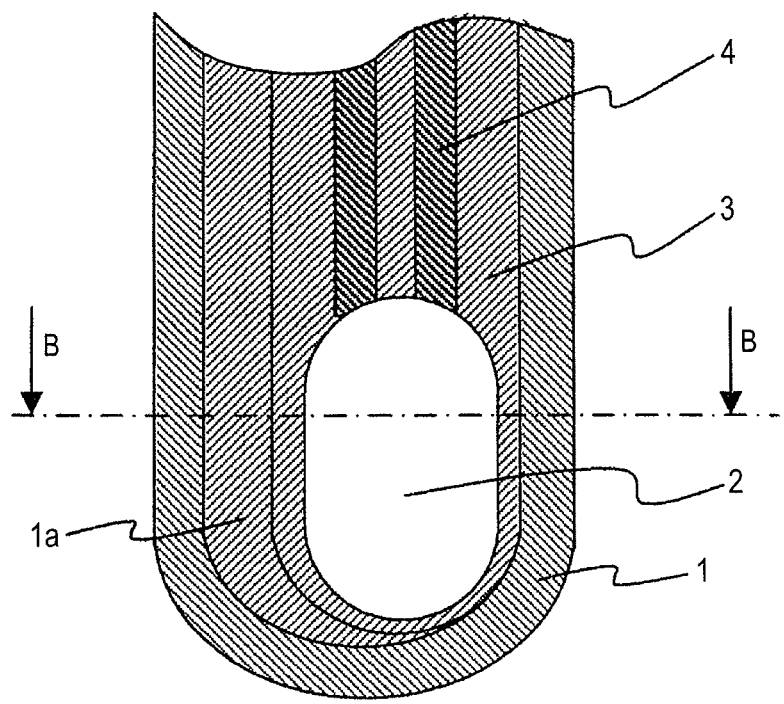
FIG. 2 is an enlarged view showing a portion A in FIG. 1.
Figure 3:
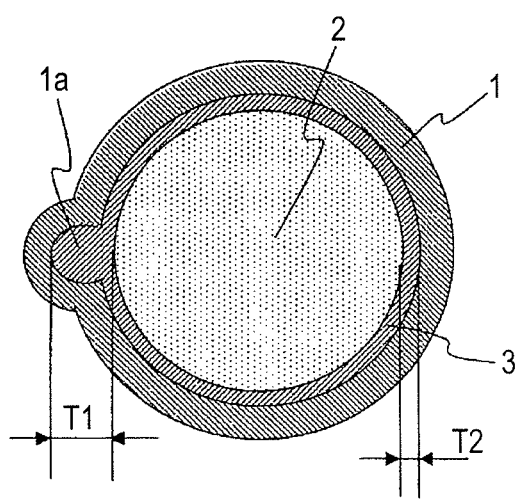
FIG. 3 is a cross-sectional view taken along line B-B in FIG. 2.

FIG. 1 is a cross-sectional view showing a temperature sensor, which illustrates a first embodiment of the invention. FIG. 2 is an enlarged view showing a portion A in FIG. 1. FIG. 3 is a cross-sectional view taken along line B-B in FIG. 2.

The temperature sensor has a case 1 made of resin, a temperature detector element 2 sealed in the case 1, and a filler 3 for sealing the temperature detector element 2 in the case 1. A signal detected by the temperature detector element 2 passes through a lead wire 4, and is sent via a terminal 5 to outside.

The filler 3 may be injected into the case 1 first, thereafter followed by inserting the temperature detector element 2 therein, or the filler 3 may be injected after inserting the temperature detector element 2.

In this first embodiment, the case 1 is provided with a filler flowing portion 1a formed in the inner surface thereof along the insertion direction of the temperature detector element 2, for facilitating the flow of the filler 3.

FIG. 3 shows an example in which one protruding portion formed in the inner wall of the case 1 is formed as the filler flowing portion 1a.

Here, assume a case in which the filler 3 is injected in the case 1 and thereafter the temperature detector element 2 is inserted therein.

Figure 12:
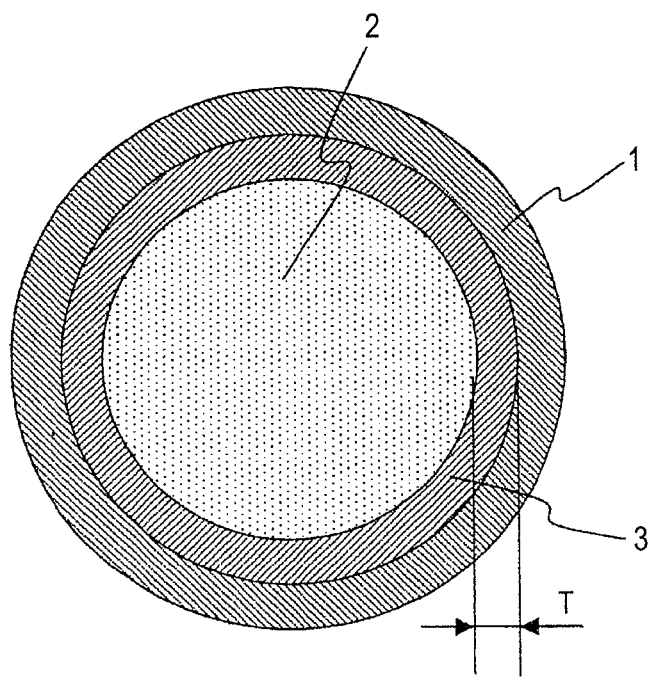
FIG. 12 is a cross-sectional view showing a conventional example, corresponding to FIG. 3 of the invention.

FIG. 12 shows a cross-sectional view taken along line B-B of the conventional product. In order to allow the filler 3 to move over the temperature detector element 2 (i.e., in order to allow the temperature detector element 2 to sink into the filler 3) when the temperature detector element 2 is inserted in the case 1, a gap T or greater is necessary between the inner surface of the case 1 and the temperature detector element 2 as the gap necessary for the movement of the filler 3. The gap T varies depending on the viscosity of the filler 3. The gap T may be made larger when the viscosity of the filler 3 is higher, while the gap T may be made smaller when the viscosity of the filler 3 is lower.

In FIG. 3 showing the first embodiment, the gap T1 necessary for movement of the filler 3 is ensured between the inner surface of the case 1 and the temperature detector element 2 by the filler flowing portion 1a provided in the inner wall of the case 1 in a protruding manner, so the filler 3 can easily move. Therefore, the gap other than the filler flowing portion 1a is not involved in the movement of the filler 3, so the gap T2 involved in temperature conduction can be made far smaller than the gap T.

Thus, by separating the gap T1 necessary for the movement of the filler 3 from the gap T2 involved in temperature conduction, it becomes possible to fabricate a temperature sensor with a faster temperature response than the conventional product. It should be noted that in the first embodiment, a protruding portion is provided in the inner surface of the case 1 as the filler flowing portion 1a, but the same advantageous effects can be obtained when a recessed portion is provided in the temperature detector element 2.

In order to improve the temperature response, a greater effect can be obtained when the heat conductivity of the filler 3 itself is increased, in addition to the above-described configuration. Therefore, it is possible to use, as the filler 3, one in which a filler metal is contained in an adhesive agent, for example, aluminum oxide is contained in a silicone adhesive agent. However, the filler 3 containing a filler metal has a higher viscosity. For this reason, in the conventional example, the movement of the filler 3 becomes difficult, and it is necessary to widen the gap T. In contrast, in the first embodiment, the filler 3 moves in the gap T1 and the gap T2 is not involved in the movement of the filler 3; therefore, the effect of reducing the gap T to T2 and the effect of increasing the heat conductivity of the filler 3 synergistically serve to make the temperature response faster.

As described above, in the first embodiment, the temperature sensor has a closed-bottom tubular shaped case 1, a temperature detector element 2 inserted and accommodated in the case 1, and a filler 3 filled in the case 1 and sealing the temperature detector element 2, the temperature sensor having a filler flowing portion 1a formed in an inner surface of the case 1 along an insertion direction of the temperature detector element 2 and having a gap relative to the temperature detector element 2 larger than that relative to the remainder portion of the gap. This makes possible stuffing with the filler or burying of the temperature detector element even in a gap between the case and the temperature detector element such that the gap cannot be filled with a filler and is left as a space with the conventional example or that the temperature detector element cannot sink into the filler with the conventional example. As a result, a temperature sensor having faster temperature response can be achieved.

Second Embodiment

Figure 4:
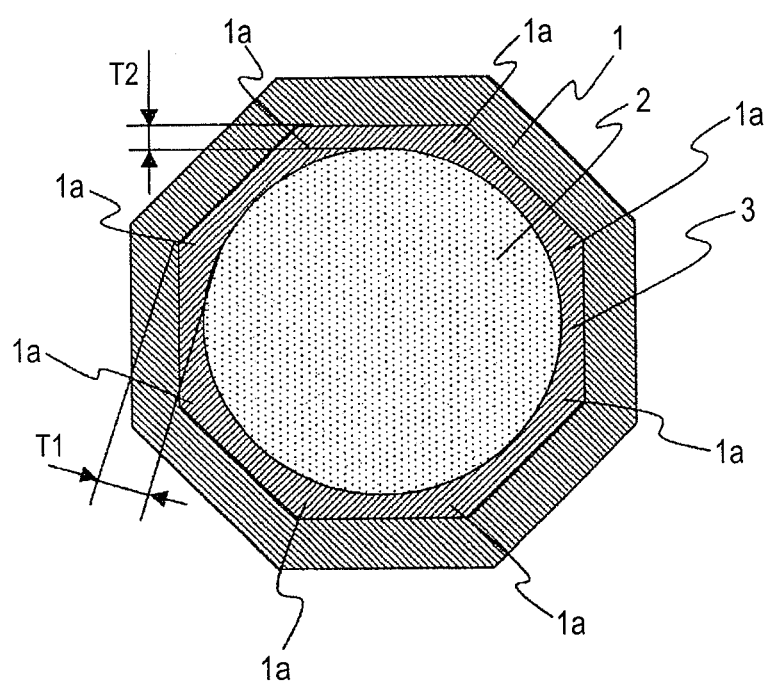
FIG. 4 is a cross-sectional view showing a temperature sensor according to a second embodiment of the invention.

FIG. 4 is a cross-sectional view of a temperature sensor according to a second embodiment of the invention, which corresponds to a cross-sectional view taken along line B-B in FIG. 2. In the second embodiment, the filler flowing portion 1a is constructed by forming the inner wall of the case 1 into a polygonal shape.

In this configuration, plural filler flowing portions 1a are radially disposed in the case inner wall, and the gap T1 necessary for movement of the filler 3 are ensured at each corner portion between the inner surface of the case 1 and the temperature detector element 2. Thus, it becomes possible to reduce the gap T2 in the portions other than the corner portions, which is involved in the temperature conduction.

As a result, the temperature detector element 2 can be centered relative to the case 1 more easily, and moreover, the effect of lessening the variation of temperature response can be obtained.

Third Embodiment

Figure 5:
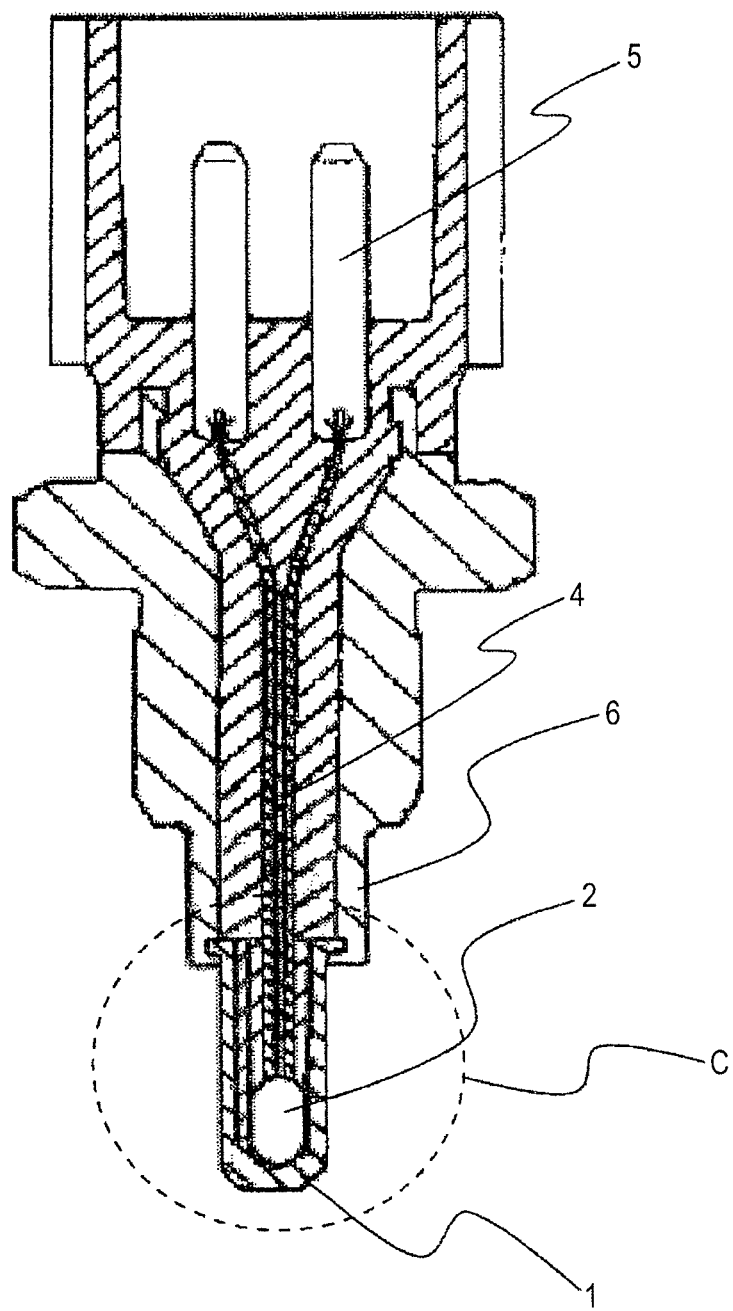
FIG. 5 is a cross-sectional view showing a temperature sensor according to a third embodiment of the invention.
Figure 6:
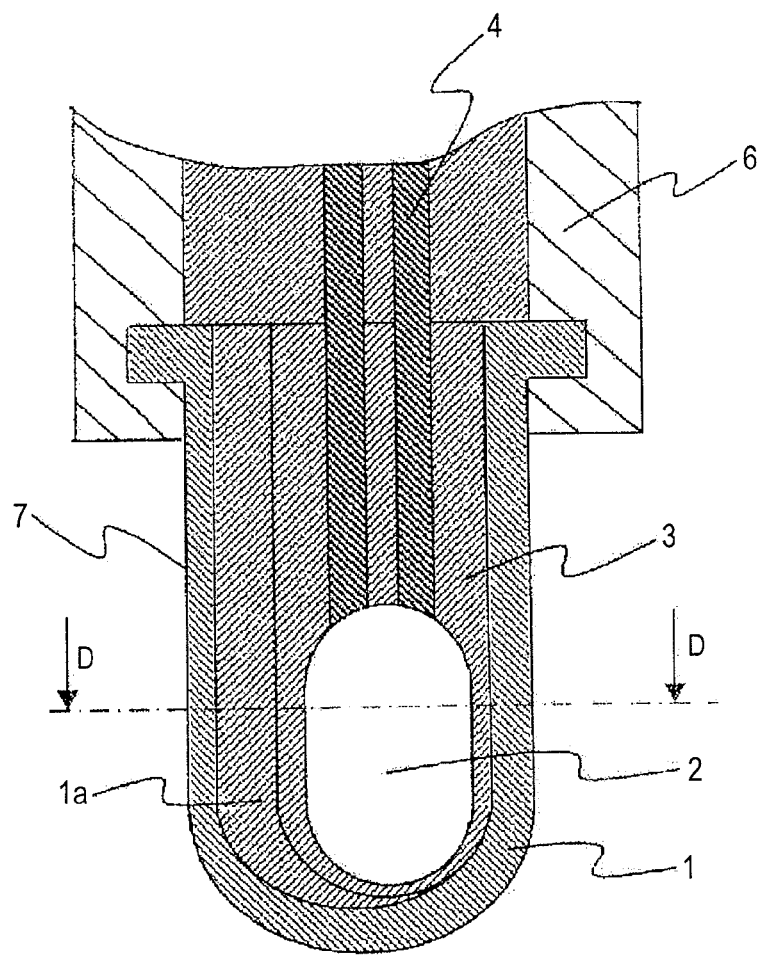
FIG. 6 is an enlarged view showing a portion C in FIG. 5.
Figure 7:
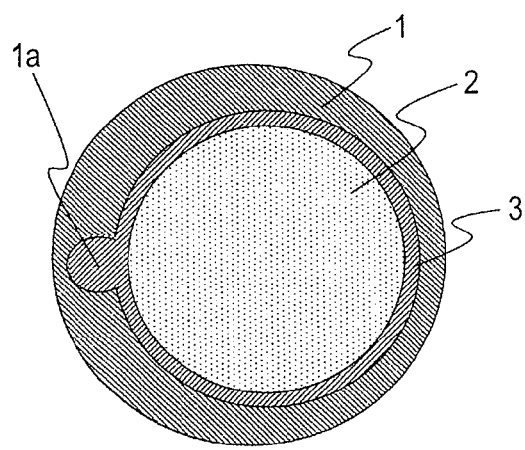
FIG. 7 is a cross-sectional view taken along line D-D in FIG. 2.

FIG. 5 is a cross-sectional view of a temperature sensor, which illustrates a third embodiment of the invention. FIG. 6 is an enlarged view of the portion C in FIG. 5, and FIG. 7 is a cross-sectional view taken along line D-D in FIG. 6.

Increasing the heat conduction of the material for the case 1 itself also serves to increase the temperature response. Referring to FIG. 5, the case 1 is made of a metal or a resin material containing a filler metal to increase the heat conduction of the case 1 itself. This is inserted in a mold, and postforming is carried out to form a base 6, which serves as the package. The rest is similar to FIG. 1.

In this case, the case 1 is molded by inserting the case 1 in a mold, which is not shown in the drawings. Therefore, the directional property to the mold is eliminated by forming the outer shape of a portion 7 of the case 1 that is supported by the postforming mold into a cylindrical shape.

Such a configuration eliminates the directional property when inserting the case 1 into the mold, eliminating the need of human work such as matching directions. As a result, it becomes possible to use automatic feeding, for example, by a parts feeder, so the productivity increases and it becomes possible to reduce costs. Moreover, a temperature sensor having a further faster temperature response can be obtained by combining this embodiment with the foregoing embodiments.

Fourth Embodiment

Figure 8:
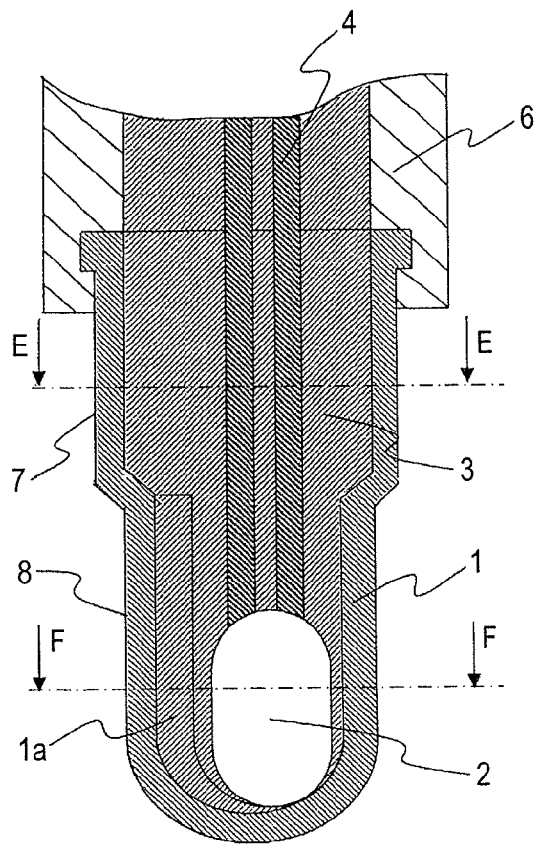
FIG. 8 is an enlarged view illustrating a fourth embodiment of the invention, showing a portion thereof corresponding to a portion C in FIG. 5.
Figure 9:
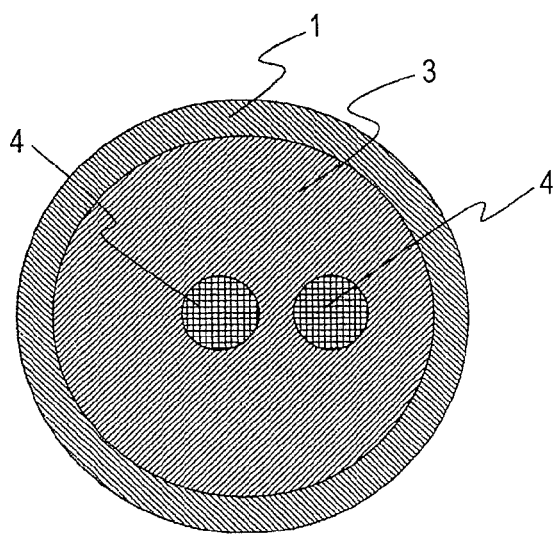
FIG. 9 is a cross-sectional view taken along line E-E in FIG. 8.
Figure 10:
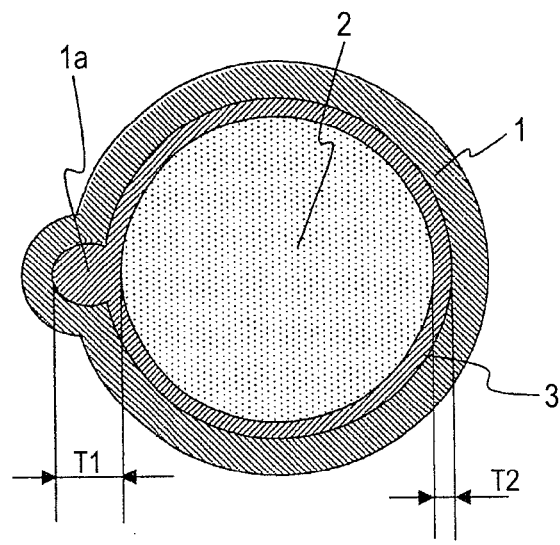
FIG. 10 is a cross-sectional view taken along line F-F in FIG. 8.

FIG. 8 is an enlarged view illustrating a portion of a fourth embodiment corresponding to a portion C in FIG. 5, which illustrates an example in which the case 1 is subjected to postforming. FIG. 9 is a cross-sectional view taken along line E-E of the portion 7 in FIG. 8, to be supported by the mold, and FIG. 10 is a cross-sectional view taken along line F-F of a temperature conducting portion 8.

In the fourth embodiment, the case 1 is divided into a portion 7 supported by a postforming mold and a temperature conducting portion 8 provided with the filler flowing portion 1*a*.

In this way, the temperature conducting portion 8 provided with the filler flowing portion 1*a* is allowed to have the same shape as shown in FIG. 1 even when the outer shape of the portion 7 supported by the mold is formed in a cylindrical shape. Therefore, unlike the case 1 shown in FIG. 7, the wall thickness of the case 1 does not become non-uniform, and the required minimum wall thickness can be realized as shown in FIG. 10. As a result, the temperature response can be made further faster.

Fifth Embodiment

Figure 11:
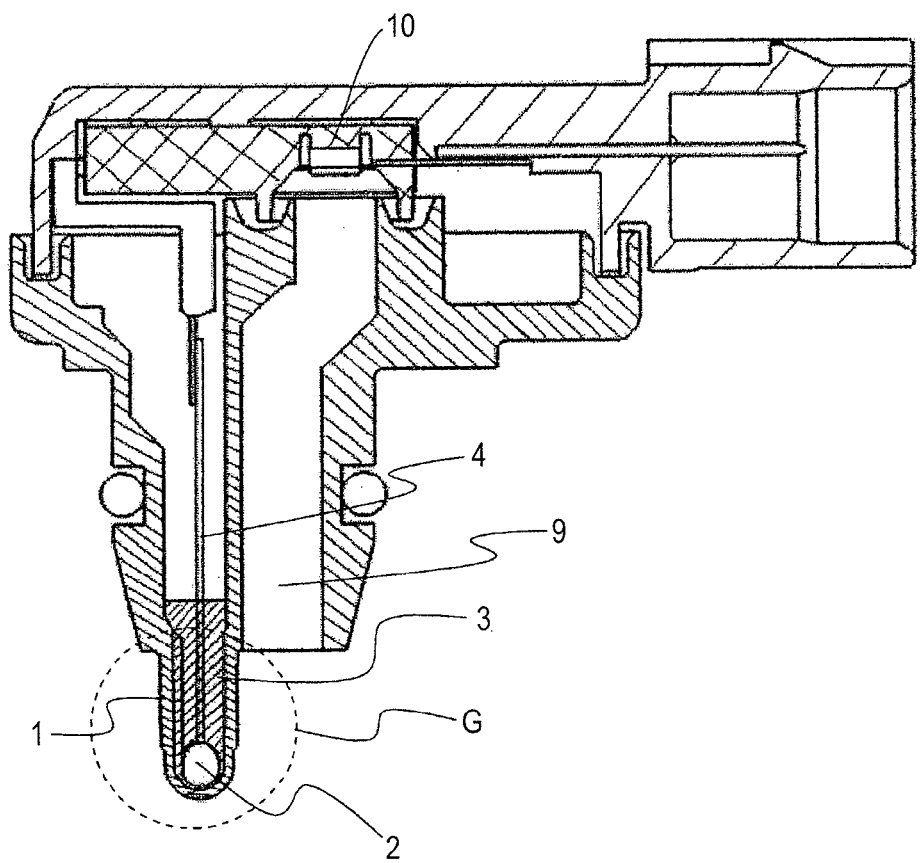
FIG. 11 is a cross-sectional view of a pressure sensor incorporating a temperature sensor illustrating a fifth embodiment of the invention.

FIG. 11 is a cross-sectional view of a pressure sensor incorporating a temperature sensor illustrating a fifth embodiment of the invention, which is an on-vehicle pressure sensor incorporating the temperature sensor having the structure as described above in a temperature detector element portion. Pressure is guided from a pressure introducing hole 9 to the inside of the pressure sensor, converted into an electric signal by a pressure sensor element 10, and then output to outside. The temperature sensor portion corresponds to a portion G, and any one of the temperature sensors according to the foregoing embodiments may be applied thereto.

The on-vehicle pressure sensor is exposed to a polluted environment such as EGR. For this reason, it is absolutely necessary to protect the temperature detector element 2, and it is necessary to enclose the temperature detector element 2 in the case 1. However, for controlling the engine, it is desired that the temperature detector element should have fast temperature response. By employing the invention thereto, it becomes possible to obtain an on-vehicle pressure sensor incorporating a temperature sensor that has fast temperature response and high pollution resistance.

Various modifications and alterations of this invention will be apparent to those skilled in the art without departing from the scope and spirit of this invention, and it should be understood that this is not limited to the illustrative embodiments set forth herein.

What is claimed is:

1. A temperature sensor comprising:
    a closed-bottom tubular shaped case;
    a temperature detector element inserted and accommodated in the case; and
    a filler filled in the case and sealing the temperature detector element,
    a gap formed between the case and the temperature detector element,
    the gap having a filler flowing portion formed along an insertion direction of the temperature detector element,
    wherein the filler flowing portion is a larger gap than a remainder of the gap other than the filler flowing portion,
    wherein the filler flowing portion is provided in an inner wall of the case so as to protrude outwardly in a radial direction,
    wherein the remainder of the gap other than the filler flowing portion is smaller than the filler flowing portion.

2. The temperature sensor according to claim 1, wherein the filler flowing portion is formed by forming an inner wall cross section of the case into a polygonal shape.

3. The temperature sensor according to claim 1, wherein the filler is an adhesive agent containing a filler metal.

4. The temperature sensor according to claim 1, wherein the case is provided with a base to be a package by postforming, forming an outer shape of a portion of the case that is supported by postforming mold into a cylindrical shape.

5. The temperature sensor according to claim 4, wherein the case is divided into the portion supported by the postforming mold and a temperature conducting portion provided with the filler flowing portion.

6. The temperature sensor according to claim 1, integrated with an on-vehicle pressure sensor.

7. The temperature sensor according to claim 1, further comprising the gap having a first thickness and the filler flowing portion having a second thickness,
    wherein the second thickness is greater than the first thickness.

8. The temperature sensor according to claim 1, wherein the filler flowing portion allows for movement of the filler and the remainder of the gap is involved with temperature conduction between the case and the temperature detector element.

* * * * *